UNITED STATES PATENT OFFICE.

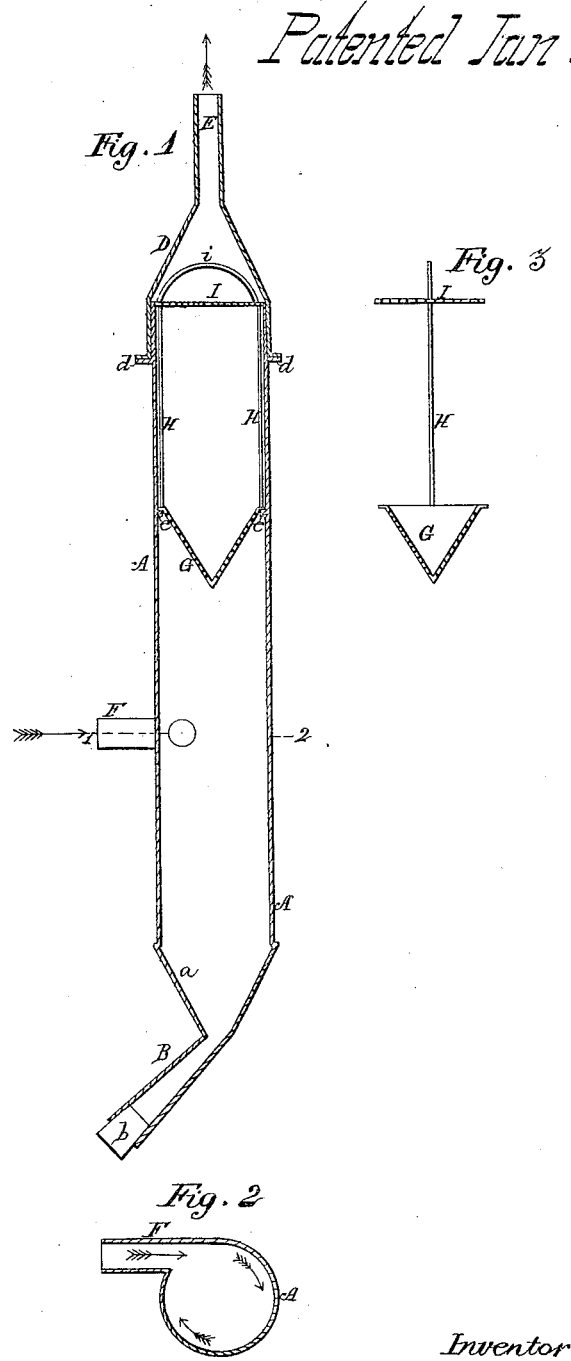

J. GEORGE LEFLER, OF PHILADELPHIA, PENNSYLVANIA.

IMPROVEMENT IN FILTERS.

Specification forming part of Letters Patent No. 41,075, dated January 5, 1864.

*To all whom it may concern:*

Be it known that I, J. GEORGE LEFLER, of Philadelphia, Pennsylvania, have invented a new and Improved Filter; and I do hereby declare the following to be a full, clear, and exact description of the same, reference being had to the accompanying drawings, and to the letters of reference marked thereon.

My improved filter, which is fully described hereinafter, has been constructed with the view of readily withdrawing the filtering material from the casing within which it is contained when the said material has to be cleansed or replenished.

In order to enable others to make and use my invention, I will now proceed to describe its construction and operation.

On reference to the accompanying drawings, which form a part of this specification, Figure 1 is a vertical section of my improved filter; Fig. 2, a section plan on the line 1, 2, Fig. 1; and Fig. 3, a detached sectional view of part of the filter.

Similar letters refer to similar parts throughout the several views.

A is a hollow cylindrical casing, of metal or other material, situated in the cellar or yard of a dwelling-house, or in any other locality which may be considered desirable. This casing A has at the lower end the inverted cone-shaped termination $a$, to which the pipe B is secured, or of which it forms a part, the said pipe being furnished with an ordinary detachable plug, $b$, or a suitable stop-cock or valve.

Over the upper end of the case A fits a cap-piece, D, which rests on and is secured to a flange, $d$, on the casing, the cap being of the form illustrated in the drawings or of any other form which may be found convenient, the cap-piece terminating at the top in the outlet-pipe E, communicating with the pipe through which the filtered water passes to the cocks or hydrants.

F is the inlet-pipe, communicating with the street-main, this pipe being situated midway, or thereabouts, between the top and bottom of the casing A, to one side of which the said pipe is attached in the manner represented in Fig. 2, so that the water as it enters the case may take the direction pointed out by the arrows.

On the inside of the casing A is a flange, $e$, on which rests the upper flanged edge of the cone-shaped plate G, which may consist of fine wire-gauze or thin metal perforated with a number of small holes.

The plate G is connected by two or more wires, H, to a perforated plate or disk of fine wire-gage, I, to which is secured a bent wire, $i$, forming a handle, by means of which the plate G and plate I, with their connecting-wires, may be withdrawn from the casing when the cap D is removed.

The filtering material is deposited within the casing A between the conical perforated plate G and the perforated plate or wire-gauze I. This material may consist of ordinary filtering sand or charcoal, or other well known filtering substances, although I prefer a lower mass of sea-gravel resting on the lower plate, G, and above this gravel a mass of properly-washed pure sand.

I have found by lengthened practical tests that this arrangement of sand and gravel serves the desired purpose admirably.

It will be advisable at times to remove the filtering material either to cleanse it or replace it with new material. This can be readily done after simply removing the cap-piece D.

I claim as my invention and desire to secure by Letters Patent—

1. The perforated plates G and I, connected together by rods H, or their equivalents, and arranged for retaining a mass of filtering material within a casing, A, and for the withdrawal of the said filtering material from the casing, substantially as and for the purpose herein set forth.

2. In combination with the above, the cap D, adapted to the casing, and rendered detachable from the same, as set forth.

In testimony whereof I have signed my name to this specification in the presence of two subscribing witnesses.

J. GEORGE LEFLER.

Witnesses:
 HENRY HOWSON,
 JOHN WHITE.